US011971749B2

(12) United States Patent
Maenpaa et al.

(10) Patent No.: US 11,971,749 B2
(45) Date of Patent: Apr. 30, 2024

(54) COMMUNICATION DEVICE WITH A SUSPENDED DISPLAY STACK

(71) Applicant: Huawei Technologies Co., Ltd., Shenzhen (CN)

(72) Inventors: Ossi Maenpaa, Helsinki (FI); Jouni Tapio Mäki, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 757 days.

(21) Appl. No.: 16/968,060

(22) PCT Filed: Feb. 21, 2018

(86) PCT No.: PCT/EP2018/054249
§ 371 (c)(1),
(2) Date: Aug. 6, 2020

(87) PCT Pub. No.: WO2019/161892
PCT Pub. Date: Aug. 29, 2019

(65) Prior Publication Data
US 2021/0055769 A1    Feb. 25, 2021

(51) Int. Cl.
*G06F 1/16*     (2006.01)
*G06F 3/01*     (2006.01)

(52) U.S. Cl.
CPC .......... *G06F 1/1637* (2013.01); *G06F 1/1605* (2013.01); *G06F 3/016* (2013.01)

(58) Field of Classification Search
CPC ...... G06F 1/1637; G06F 3/016; G06F 1/1643; G06F 3/0488; G06F 3/041; H04M 1/035; H04M 1/0266; H04M 2250/22; H04M 1/03; G10K 9/122; H04R 7/045; H04R 7/04
See application file for complete search history.

(56) References Cited

U.S. PATENT DOCUMENTS

| | | | |
|---|---|---|---|
| 10,142,717 B2* | 11/2018 | Behles | G06F 1/1626 |
| 10,645,834 B2* | 5/2020 | Tossavainen | H04M 1/03 |
| 11,669,167 B2* | 6/2023 | Tan | G06F 3/0414 |
| | | | 715/702 |
| 2006/0140437 A1 | 6/2006 | Watanabe et al. | |

(Continued)

FOREIGN PATENT DOCUMENTS

| | | |
|---|---|---|
| CN | 203289642 U | 11/2013 |
| CN | 103927017 A | 7/2014 |
| WO | 2014024010 A1 | 2/2014 |

*Primary Examiner* — Nidhi Thaker
(74) *Attorney, Agent, or Firm* — Leydig, Voit & Mayer, Ltd.

(57) ABSTRACT

The disclosure concerns a communication device comprising a housing with a front body and a main body. The front body comprises a display unit having a plurality of layers attached to one another. The plurality of layers comprises a suspension layer and a second layer, wherein one of the layers is a display. At two opposing edges of the suspension layer, the suspension layer extends laterally beyond at least the second layer. The suspension layer is suspended by attachment of the two opposing edges to the main body. By extending the suspension layer laterally beyond at least the second layer of the plurality of layers and by attaching the suspension layer to the main body, the entire display unit is efficiently suspended and is movable up and down in a manner efficient for the emission of sound.

10 Claims, 5 Drawing Sheets

(56) References Cited

U.S. PATENT DOCUMENTS

| | | |
|---|---|---|
| 2011/0051334 A1 | 3/2011 | Griffith et al. |
| 2013/0250502 A1* | 9/2013 | Tossavainen ............ H04M 1/03 361/679.01 |
| 2015/0169002 A1* | 6/2015 | Kemppinen ............ G06F 1/1633 361/679.55 |
| 2015/0220116 A1* | 8/2015 | Kemppinen ............ G06F 3/041 361/679.01 |

* cited by examiner

COMMUNICATION DEVICE WITH A SUSPENDED DISPLAY STACK

CROSS-REFERENCE TO RELATED APPLICATIONS

This application is a National Stage of International Application No. PCT/EP2018/054249, filed on Feb. 21, 2018, which is hereby incorporated by reference in its entirety.

TECHNICAL FIELD

Aspects of the present disclosure relate to a communication device comprising a housing which comprises a front body and a main bod.

BACKGROUND OF THE INVENTION

A display stack of the mobile device may be used as a sound emitting element. To be able to produce the required sound pressure, the display stack should be able to bend or be movable up and down, and an attachment of the display stack enabling this movement should be provided.

SUMMARY

It has been found by the inventors that the display stack should be movable up and down without bending the display stack too much in order to efficiently produce sound. The flexibility of the suspension of the display stack has a direct impact on the sound system efficiency. Too stiff suspension of the display stack can be compensated by increased mechanical actuator force.

Conventionally, a flexible suspension of the display stack has been attained by using flexible glue when attaching the display stack to the mobile phone main body. However, there are several drawbacks with the use of glue in this manner, e.g. glue process variation causing variation in audio performance, and difficulty in performing service of the mobile phone after assembly. It is also difficult to find a suitable glue that is flexible enough. Glue which is too stiff will compromise the audio performance.

It has been found by the inventors that with a display stack firmly attached to the main body of the mobile phone, the electro-acoustical efficiency is poor. This means that there is a lack of sound pressure level, poor performance at low frequencies and distorted sound.

An object of embodiments of the present invention is thus to provide an improved communication device solving at least some of the problems mentioned above.

According to a first aspect of the invention, the above-mentioned object is attained by providing a communication device comprising a housing which comprises a front body and a main body. The front body comprises a display unit. The display unit comprises a plurality of layers attached to one another, and the layers are substantially parallel to one another. The plurality of layers comprises
  a suspension layer; and
  a second layer, wherein
one of the layers is a display. Each layer has a front, a back and four edges surrounding the front and back. At two opposing edges of the suspension layer, the suspension layer extends laterally beyond at least the second layer. The suspension layer is flexible e.g. could be made of a flexible material. The suspension layer is suspended by attachment of the two opposing edges to the main body.

Thus, by embodiments of the present invention, the suspension layer of the display unit/stack is oversized in relation to the other layers of the display unit. By embodiments of the present invention, the suspension of the display stack can be an integrated part of the display stack without adding any additional suspension means.

By extending the suspension layer only laterally beyond at least the second layer of the plurality of layers and by attaching the suspension layer to the main body, the entire display unit is efficiently suspended and is movable up and down in a manner efficient for the creation of sound pressure and the emission of sound, e.g. to emit sound in a wide range of frequencies. Preferably only the suspension layer and no other layer of the display unit is attached to the main body. It should be understood however, that the suspension layer itself may be formed by several sub-layers e.g. of different materials. By the embodiments of the invention, suitable sound pressure is produced without bending the display stack too much. Furthermore, the solution also works well at lower frequencies. By the solution of the embodiments, i.e. not to attach all layers of the display unit to the main body, an improved attachment of the display unit (also designated as display stack) with regard to sound emission is provided.

By "substantially parallel" it is meant that the layers are essentially parallel but that there may be tolerances or inaccuracies of a few degrees due to manufacturing tolerances.

In a possible implementation form of the communication device according to the first aspect, along the two opposing edges of the suspension layer, the suspension layer extends laterally beyond at least the second layer, and the suspension layer is suspended by attachment of the two opposing edges to the main body along the two opposing edges. By attaching the suspension layer along the entire length of two opposing edges, the suspension of the suspension layer is further improved and thus the suspension of the entire display unit is further improved.

In a further possible implementation form of the communication device according to the first aspect, at all four edges of the suspension layer, the suspension layer extends laterally beyond at least the second layer, and the suspension layer is suspended by attachment of its four edges to the main body. By attaching the suspension layer at all four edges of the suspension layer, the suspension of the suspension layer is further improved and thus the suspension of the entire display unit is further improved.

In another possible implementation form of the communication device according to the first aspect, along all four edges of the suspension layer, the suspension layer extends laterally beyond at least the second layer, and the suspension layer is suspended by attachment of its four edges to the main body along the four edges. By attaching the suspension layer along the entire length of all four edges of the suspension layer, the suspension of the suspension layer is further improved and thus the suspension of the entire display unit is further improved. By this implementation, the inside of the housing is efficiently sealed off from the outside, to some extent airtight, and the display stack can therefore in an efficient manner pump air up and down and efficiently emit sound.

In yet another possible implementation form of the communication device according to the first aspect, the suspension layer is a transparent layer, e.g. a touch screen, and the second layer is the display. When the suspension layer is transparent, it may be located in front of the display, providing an efficient suspension of the suspension layer and the display unit. By this implementation, the suspension of the display unit is an integrated part of the display unit without any additional suspension means or layers.

In still another possible implementation form of the communication device according to the first aspect, the suspension layer is a polarization layer, and the second layer is the display. When the suspension layer is a polarization layer, it is transparent and located in front of the display, providing an efficient suspension. By this implementation, the suspension of the display unit is an integrated part of the display unit without any additional suspension means or layers.

In a further possible implementation form of the communication device according to the first aspect, the suspension layer is the display. By this implementation, the suspension of the display unit is an integrated part of the display unit without any additional suspension means or layers. By this implementation, an efficient suspension of the display unit is provided.

In another possible implementation form of the communication device according to the first aspect, the suspension layer is stretchable e.g. is made of a stretchable material.

In a yet another possible implementation form of the communication device according to the first aspect, the respective edges of the second layer are separated from the main body by at least one gap.

In still another possible implementation form of the communication device according to the first aspect, along one edge of the suspension layer, the suspension layer comprises a pre-formed U-shape at the respective edge. By providing the suspension layer with a U-shape, the suspension layer can stretch without being made from a stretchable material per se and still be attached at four edges, providing an efficient suspension of the suspension layer and the display unit.

In a further possible implementation form of the communication device according to the first aspect, at two opposing edges of the suspension layer, the suspension layer comprises a pre-formed U-shape. By this implementation form, the suspension layer can stretch even more while still being attached at four edges, providing an efficient suspension of the suspension layer and the display unit.

In another possible implementation form of the communication device according to the first aspect, along two opposing edges of the suspension layer, the suspension layer comprises a pre-formed U-shape at the respective edge. By this implementation form, the suspension layer can stretch even more while still being attached at four edges, providing an efficient suspension of the suspension layer and the display unit.

In yet another possible implementation form of the communication device according to the first aspect, at all four edges of the suspension layer, the suspension layer comprises a pre-formed U-shape. By this implementation form, the suspension layer can stretch even more while still being attached at four edges, providing an efficient suspension of the suspension layer and the display unit.

In still another possible implementation form of the communication device according to the first aspect, along all four edges of the suspension layer, the suspension layer comprises a pre-formed U-shape at the respective edge. By this implementation form, the suspension layer can stretch even more while still being attached at four edges, providing an efficient suspension of the suspension layer and the display unit.

The respective U-shape may open up to the inside of the housing or open up to the outside, but still efficiently seal off the inside of the housing from the outside. The respective U-shape may be part of a W-shape.

In a further possible implementation form of the communication device according to the first aspect, the communication device comprises a ring-shaped frame configured to attach the suspension layer to the main body. This is an efficient attachment of the suspension layer to the main body.

In another possible implementation form of the communication device according to the first aspect, the communication device comprises an actuator (or vibrator) attached to the display unit and to the main body, and the actuator is configured to make the display unit vibrate and emit sound, whereby the actuator and display unit function as a loudspeaker. By this implementation form, an efficient actuation of the display unit is provided, efficiently moving the display unit up and down to emit sound.

In yet another possible implementation form of the communication device according to the first aspect, the communication device comprises an actuator (or vibrator) attached to the display unit and to the main body, and the actuator is configured to make the display unit vibrate to provide tactile feedback for a touch display. By this implementation form, an efficient actuation of the display unit is provided, efficiently moving the display unit up and down to provide tactile feedback for a touch display. When the implementation form for tactile feedback and the implementation form for sound emission are combined, they can share the same actuator. However, they can also have separate actuators. An implementation form may include the tactile feedback without the sound emission, and vice versa.

The above-mentioned features and implementation forms, respectively, may be combined in various possible ways providing further advantageous implementations. Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

The communication device 102 herein disclosed may be denoted as a user device, a User Equipment (UE), a mobile station, an internet of things (IoT) device, a sensor device, a wireless terminal and/or a mobile terminal, enabled to communicate wirelessly in a wireless communication system, sometimes also referred to as a cellular radio system, especially an LTE or New Radio (NR/5G) communication system. The UEs may further be referred to as mobile telephones or cellular telephones with wireless capability. The UEs in the present context may be pocket-storable and is portable, hand-held, computer-comprised, or vehicle-mounted mobile devices, enabled to communicate voice and/or data, via the radio access network, with another entity, such as another receiver or a server.

Figure 1:
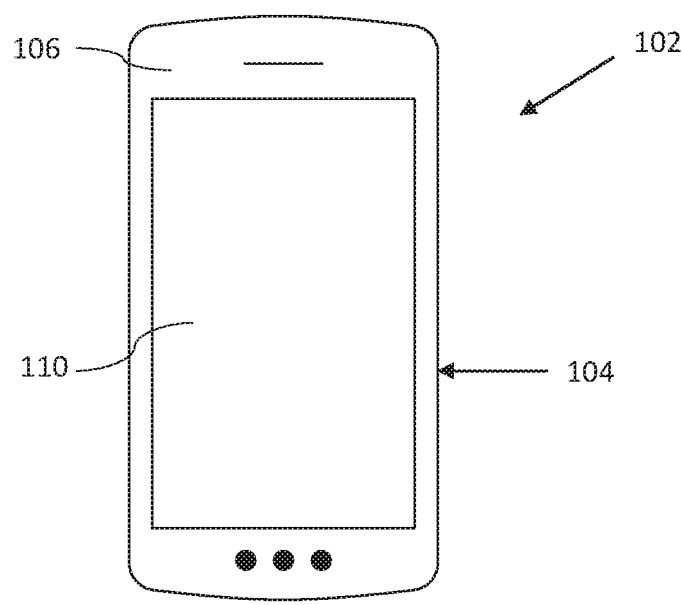
FIG. 1 is a schematic top view of an embodiment of the communication device.
Figure 2:
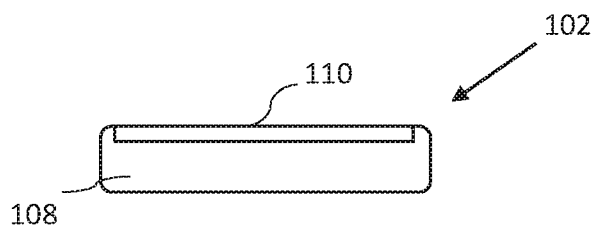
FIG. 2 is a schematic side view of the communication device of FIG. 1.

With reference to FIGS. 1 and 2, an embodiment of the communication device 102 is schematically illustrated. The communication device 102 includes a housing 104. The housing 104 includes a front body 106 and a main body 108. The front body 106 includes a display unit 110. The display unit 110 comprises a plurality of layers attached to one another. The layers, which are parallel to one another, are described in further detail herein below.

Figure 3:
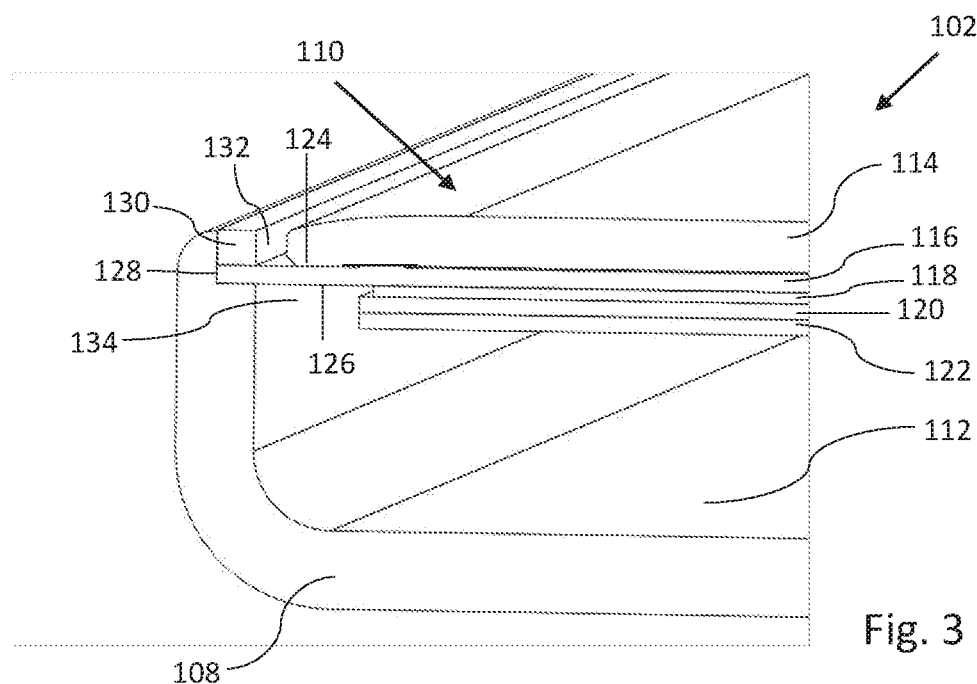
FIG. 3 is schematic partial perspective view of the communication device of FIG. 1.
Figure 4:
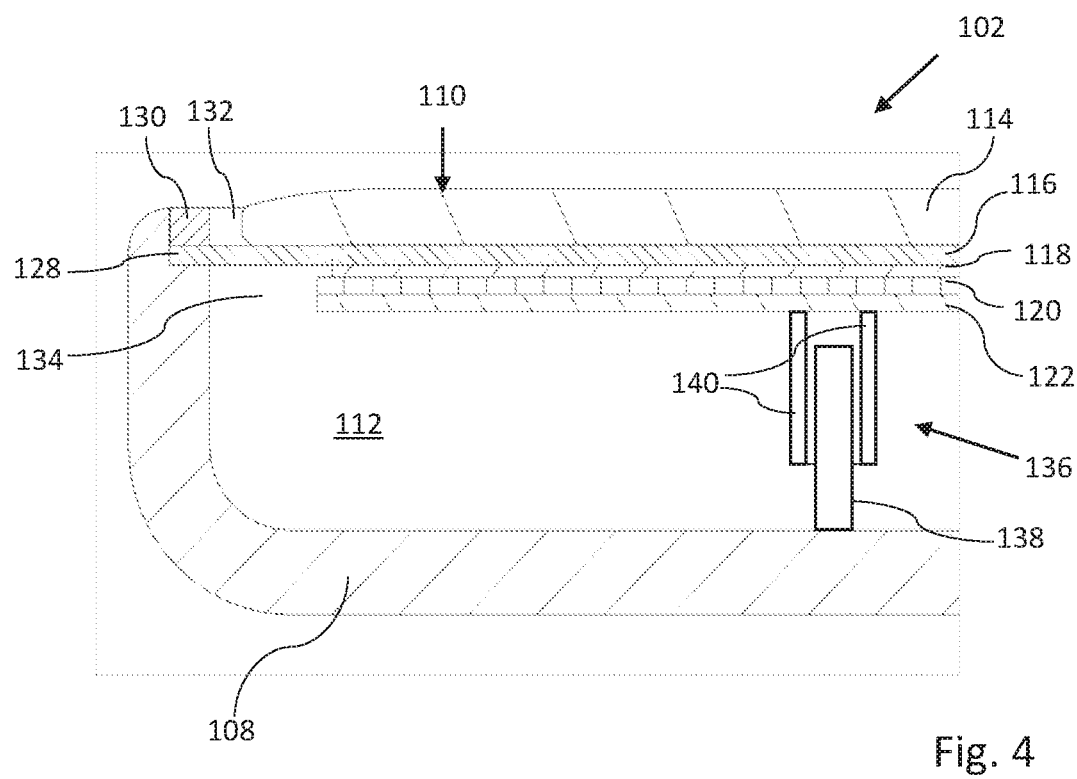
FIG. 4 is a schematic sectional view of the communication device of FIG. 1.

With reference to FIGS. 3 and 4, a partial section of the communication device 102 of FIGS. 1-2 is schematically illustrated. The main body 108 has an interior 112 which may house a chassis, an antenna etc., but these details are left out for illustrative purposes. As illustrated, the display unit 110 includes a plurality of layers 114, 116, 118, 120, 122 attached to one another and being parallel to one another. The plurality of layers comprises a transparent cover layer 114 made of a hard material, e.g., a glass material. Further, the plurality of layers comprises a transparent polarization layer 116, a transparent touch screen 118, a display 120 and a metal bezel 122. Each of the polarization layer 116 and touch screen 118 may be located between the cover layer 114 and the screen 118. The polarization layer 116 has a front 124, a back 126 and four edges 128 surrounding the front 124 and back 126, which is also the case for the other layers 114, 118, 120, 122. The polarization layer 116 is made of a flexible material. The flexible material may also be a stretchable material. The polarization layer 116 may also be referred to as a suspension layer, for reasons stated below.

At two opposing edges 128 of the polarization layer 116, the polarization layer 116 extends laterally beyond at least a second layer 114, 118, 120, 122, e.g., the plurality of layers 114, 118, 120, 122. In the present case, the polarization layer 116 extends laterally beyond all of the layers 114, 118, 120, 122. At two opposing edges 128 of the suspension layer 116, the suspension layer 116 is suspended by attachment of the two opposing edges 128 to the main body 108. In the embodiment of FIGS. 3 and 4, the communication device 102 includes a ring-shaped frame 130 configured to attach the suspension layer 116 to the main body 108.

Alternatively, along the two opposing edges 128 of the suspension layer 116, the suspension layer 116 may extend laterally beyond at least the second layer 114, 118, 120, 122, and the suspension layer 116 is suspended by attachment of the two opposing edges 128 to the main body 108 along the two opposing edges 128. Alternatively, at all four edges 128 of the suspension layer 116, the suspension layer 116 extends laterally beyond at least the second layer 114, 118, 120, 122, and the suspension layer 116 is suspended by attachment of its four edges 128 to the main body 108. Alternatively, along all four edges of the suspension layer 116, the suspension layer 116 extends laterally beyond at least the second layer 114, 118, 120, 122, and the suspension layer 116 is suspended by attachment of its four edges 128 to the main body 108 along the four edges 128. The respective edges of the second layer 114, 118, 120, 122 are separated from the main body 108 by at least one gap 132, 134. Advantageously, especially the transparent hard cover layer 114 should be spaced apart from the main body 108.

With reference to FIG. 4, the communication device 102 includes an actuator 136 attached to the display unit 110 and to the main body 108. The actuator 136 is configured to make the display unit 110 vibrate and emit sound, whereby the actuator 136 and display unit 110 function as a loudspeaker. Alternatively, or in addition thereto, the actuator 136 may also be configured to make the display unit 110 vibrate to provide tactile feedback for a touch display. The actuator 136 is mechanically connected to both the display unit 110 and main body 108. The actuator 136 may include a magnet 138 and a coil 140. Then, the magnet 138 is mechanically connected to the main body 108 and coil 140 is mechanically connected to the display unit 110. The coil 140 is driven by an amplifier which in turn is connected to a converter which is connected to a processor, e.g., a Central Processing Unit, CPU. The amplifier, the converter and the processor are suitably not mounted to the display unit 110. By means of this structure, the actuator 136 can pump the display unit 110 up and down with good efficiency when a drive voltage (audio signal) is applied to the coil 140. Advantageously, the actuator 136 is attached to the lowest layer, which herein is the metal bezel 122, and attached to the center of the metal bezel 122. It is to be understood that other actuators may be used, e.g. a piezo-electric actuator, and that the actuator in FIG. 4 is schematically illustrated. When a chassis is present in the interior of the main body, the magnet may e.g. be indirectly attached to the main body via the chassis.

Figure 5:
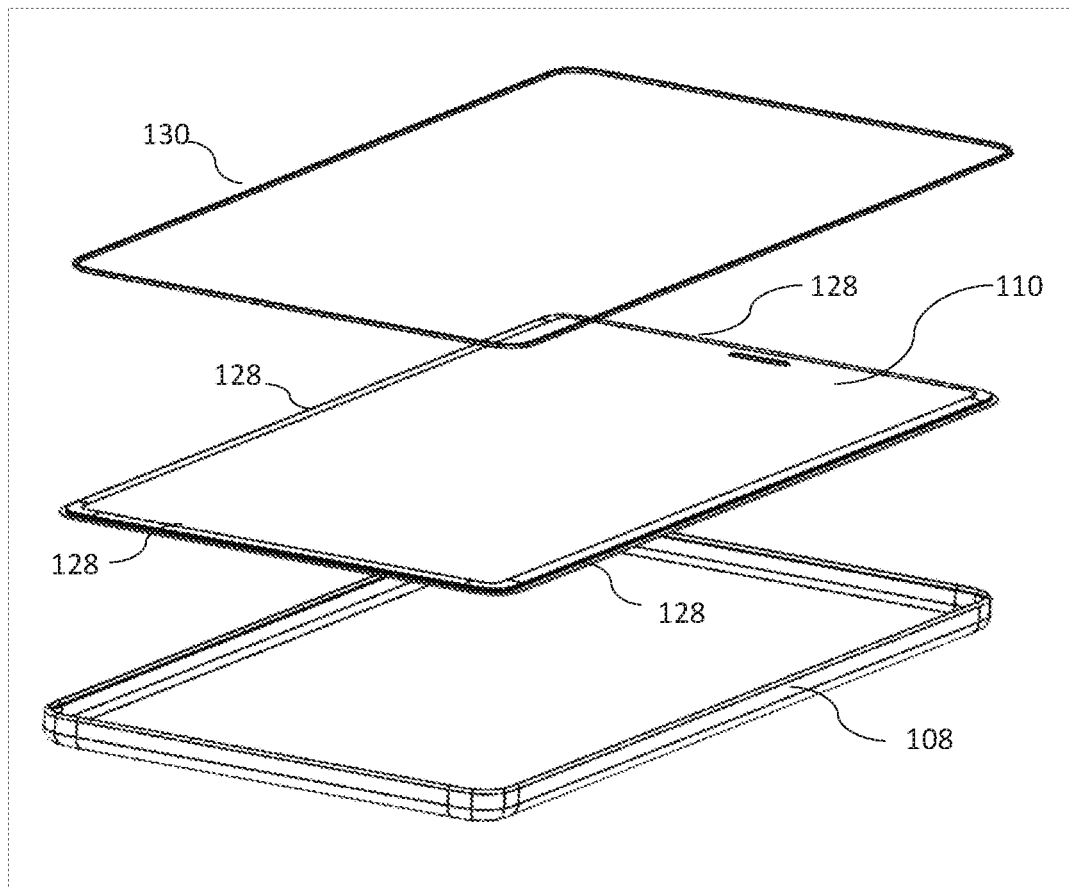
FIG. 5 is a schematic exploded view of the communication device of FIG. 1.

With reference to FIG. 5, a schematic exploded view of the communication device 102 is shown, where the main body 108 is separated from both the display unit 110 and the ring-shaped frame 130. The ring-shaped frame 130 may be locked into place by interaction with the main body 108, or glued to the main body 108. In FIG. 5, also all four edges 128 of the respective layer 116 is schematically illustrated.

Figure 6:
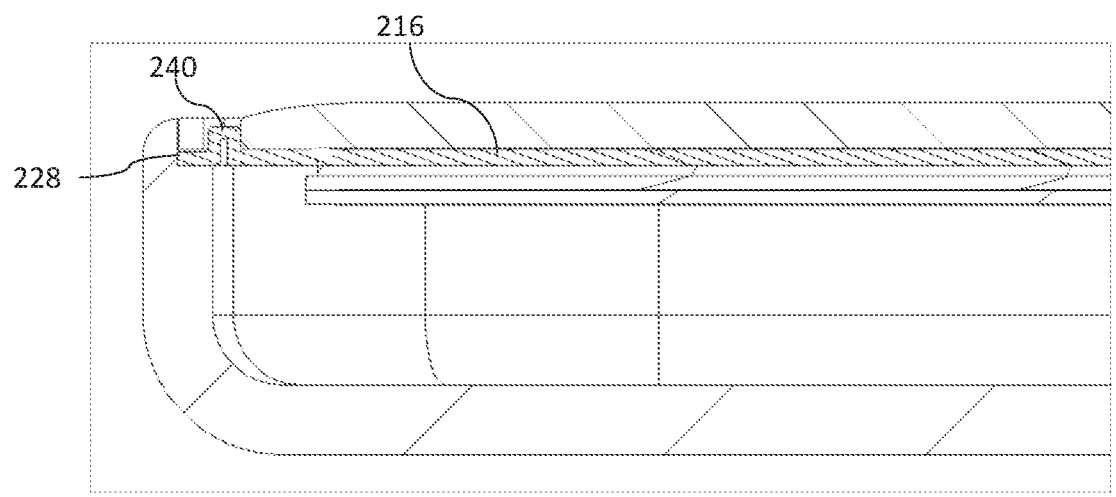
FIG. 6 is a schematic sectional view of a second embodiment of the communication device.

With reference to FIG. 6, an embodiment is schematically illustrated where the suspension layer 216 is a polarization layer 216 and may not be made of a stretchable material. Instead, along one edge 228 of the suspension layer 216, the suspension layer 216 comprises a pre-formed U-shape 240 at the respective edge, which provides the stretching needed. Advantageously, at two opposing edges 228 of the suspension layer 216, the suspension layer 216 comprises a pre-formed U-shape 240. Advantageously, along two opposing edges 228 of the suspension layer 216, the suspension layer 216 comprises a pre-formed U-shape at the respective edge 228. Advantageously, at or along all four edges 228 of the suspension layer 216, the suspension layer 216 comprises a pre-formed U-shape.

Figure 7:
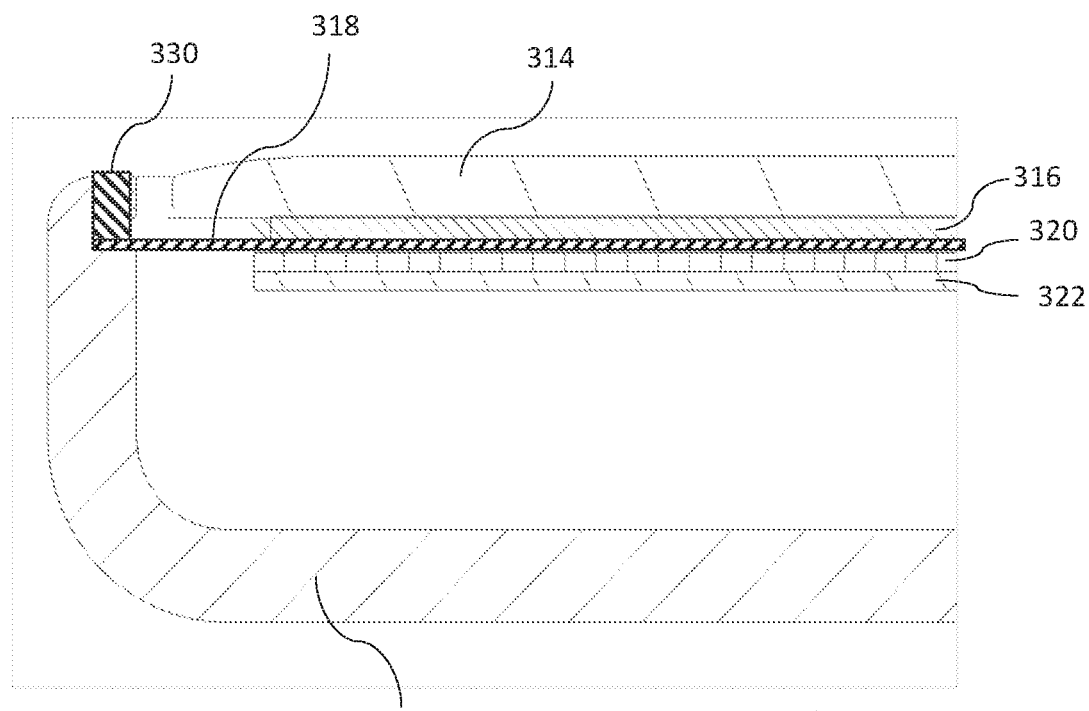
FIG. 7 is a schematic sectional view of a third embodiment of the communication device.

With reference to FIG. 7, in the embodiment shown, the suspension layer 318 is the transparent touch screen 318, and the other layers, or at least the second layer, of the plurality of layers are the transparent cover layer 314, the polarization layer 316, the display 320 and the metal bezel 322. The touch screen 318 is attached to the main body 308 by a ring-shaped frame 330. The suspension layer 318 is flexible and may suitably be stretchable.

Figure 8:
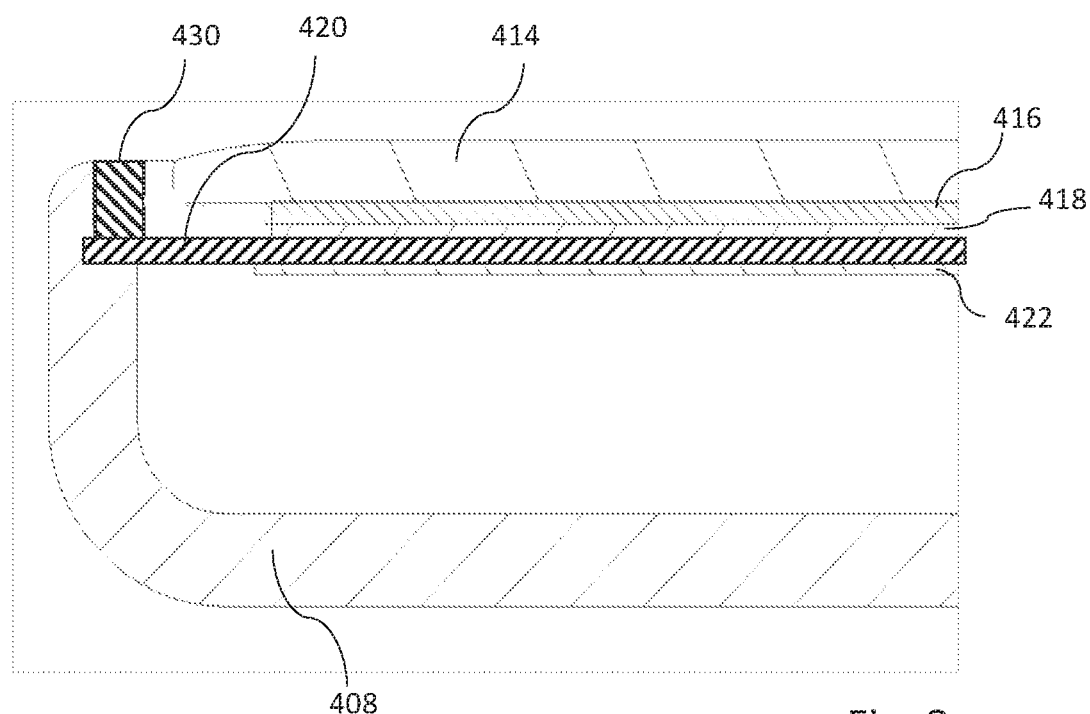
FIG. 8 is a schematic sectional view of another embodiment of the communication device.

With reference to FIG. 8, in the embodiment shown, the suspension layer 420 is the display 420, and the other layers, or at least the second layer, of the plurality of layers are the transparent cover layer 414, the polarization layer 416 and the metal bezel 422. The display 420 is attached to the main body 408 by a ring-shaped frame 430. It is to be understood that other layers may be used as the suspension layer. The suspension layer 420 is flexible and may suitably be stretchable.

The suspension layer may be made from, or include, a suitable flexible material, e.g. a polymer material.

The features of the different embodiments of the communication device disclosed above may be combined in various possible ways providing further advantageous embodiments.

Finally, it should be understood that the invention is not limited to the embodiments described above, but also relates to and incorporates all embodiments within the scope of the appended independent claims.

What is claimed is:

1. A communication device comprising: a housing having a front body and a main body, wherein the front body comprises a display unit comprising a plurality of layers attached to one another, the layers being parallel to one another, wherein the plurality of layers comprises a suspension layer and a second layer, the suspension layer is a polarization layer, the second layer including at least a touch screen layer and a metal bezel, and each layer having a front, a back and four edges surrounding the front and the back, wherein at two opposing edges of the suspension layer, the suspension layer extends laterally beyond at least the second layer, wherein the suspension layer is flexible, and wherein the suspension layer is suspended by attachment of the two opposing edges to the main body, and wherein at the two opposing edges of the suspension layer, the suspension layer comprises a pre-formed U-shape.

2. A communication device according to claim 1, wherein along the two opposing edges of the suspension layer, the suspension layer extends laterally beyond at least the second layer, and wherein the suspension layer is suspended by attachment of the two opposing edges to the main body along the two opposing edges.

3. A communication device according to claim 1, wherein at all four edges of the suspension layer, the suspension layer extends laterally beyond at least the second layer, and wherein the suspension layer is suspended by attachment of its four edges to the main body.

4. A communication device according to claim 1, wherein along all four edges of the suspension layer, the suspension layer extends laterally beyond at least the second layer, and wherein the suspension layer is suspended by attachment of its four edges to the main body along the four edges.

5. A communication device according to claim 1, wherein the second layer further includes a display layer.

6. A communication device according to claim 1, wherein the suspension layer is not stretchable.

7. A communication device according to claim 1, wherein the respective edges of the second layer are separated from the main body by at least one gap.

8. A communication device according to claim 1, wherein along one edge of the suspension layer, the suspension layer comprises the pre-formed U-shape.

9. A communication device comprising: a housing having a front body and a main body, wherein the front body comprises a display unit comprising a plurality of layers attached to one another, the layers being parallel to one another, wherein the plurality of layers comprises a suspension layer and a second layer, the suspension layer is a polarization layer, the second layer including at least a touch screen layer and a metal bezel, and each layer having a front, a back and four edges surrounding the front and the back, wherein at two opposing edges of the suspension layer, the suspension layer extends laterally beyond at least the second layer, wherein the suspension layer is flexible, wherein the suspension layer is suspended by attachment of the two opposing edges to the main body, and wherein along the two opposing edges of the suspension layer, the suspension layer comprises a pre-formed U-shape.

10. A communication device comprising: a housing having a front body and a main body, wherein the front body comprises a display unit comprising a plurality of layers attached to one another, the layers being parallel to one another, wherein the plurality of layers comprises a suspension layer and a second layer, the suspension layer is a polarization layer and a display layer, the second layer including at least a touch screen layer and a metal layer, and each layer having a front, a back and four edges surrounding the front and the back, wherein at two opposing edges of the suspension layer, the suspension layer extends laterally beyond at least the second layer, wherein the suspension layer is flexible, wherein the suspension layer is suspended by attachment of the two opposing edges to the main body, and wherein at or along all four edges of the suspension layer, the suspension layer comprises a pre-formed U-shape.

* * * * *